Figure 1:
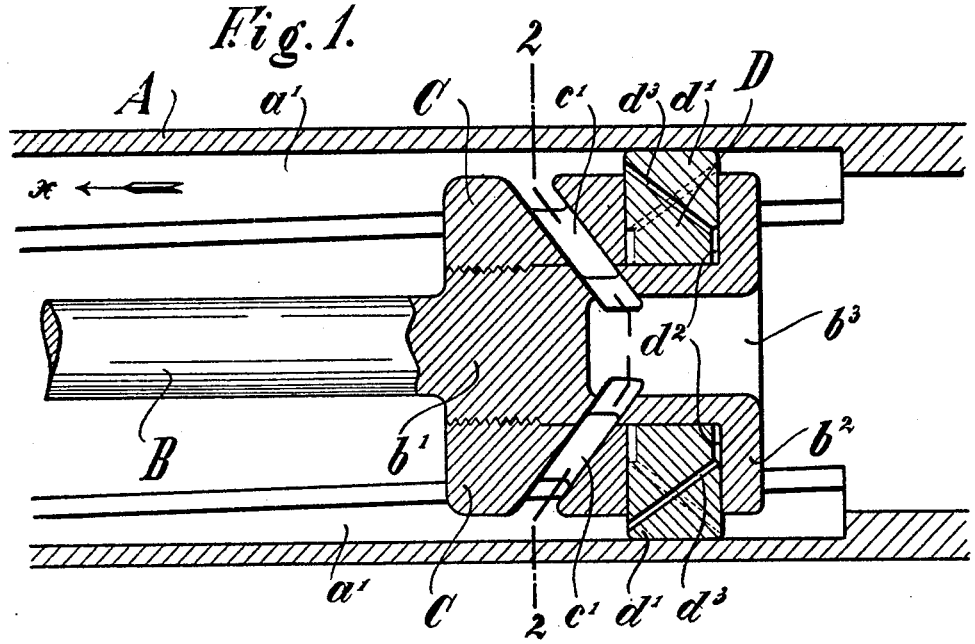

W. HEILEMANN.
FLUID BRAKE.
APPLICATION FILED APR. 21, 1909.

944,433.

Patented Dec. 28, 1909.

UNITED STATES PATENT OFFICE.

WALTER HEILEMANN, OF ESSEN-ON-THE-RUHR, GERMANY, ASSIGNOR TO FRIED. KRUPP AKTIENGESELLSCHAFT, OF ESSEN-ON-THE-RUHR, GERMANY.

FLUID-BRAKE.

944,433.  Specification of Letters Patent.  Patented Dec. 28, 1909.

Application filed April 21, 1909. Serial No. 491,351.

*To all whom it may concern:*

Be it known that I, WALTER HEILEMANN, a subject of the Emperor of Germany, and a resident of Essen-on-the-Ruhr, Germany, have invented certain new and useful Improvements in Fluid-Brakes, of which the following is a specification.

The present invention relates to the type of fluid-brakes for guns, in which the piston is provided with a part which is rotatable relatively to the piston and engages with a part of the brake-cylinder. The movement of the rotatable piston-part of this type of brake is effected, for example, by having projections on the rotatable part engage in curved guide-grooves in the brake-cylinder proper or in a guide-rod secured centrally in the brake-cylinder, the projections sliding along the walls of the guide-grooves during the relative longitudinal movement of the piston and the brake-cylinder. The fluid-pressure created during the braking will cause the rotatable piston-part to become pressed with great force against its resisting bearing on the piston or the piston-rod, the pressure acting throughout the entire braking path. Even if no other surfaces of the rotatable piston-part are exposed to the action of the fluid the pressure of the fluid will at least act on the projections of the rotatable piston-part which engage in the guide-grooves. Due to this fact considerable friction is produced between the contacting surfaces of the rotatable piston-part and its resisting bearing. This friction will, among other things, have the effect of causing the rotatable piston-part to offer considerable resistance to being turned by the projections which slide in the guide-grooves. The projections of the rotatable piston-part will therefore equally be pressed with considerable force against the appurtenant walls of the guide-grooves so that considerable friction is also produced between these parts of the fluid-brake. As the contacting surfaces of these parts must be comparatively small because the guide-grooves generally have small depth, the friction between these parts may cause the contacting surfaces to become worn to such an extent that intermediate spaces are produced between the projections of the rotatable piston-part and their guide-grooves. These intermediate spaces remain open throughout the entire braking-path and they increase in an undesirable manner the passages proper for the control of the flow of the fluid. In case of great wear these intermediate spaces may have the effect that the forces effecting the recoil and counter-recoil do not any longer become entirely absorbed, so that a shock takes place at the end of the recoil or the counter-recoil. If, for structural reasons, the projections of the rotatable piston-part must be very narrow the friction between the rotatable piston-part and the piston may even cause complete destruction of the projections.

The object of the present invention is to remove, chiefly for the recoil, the drawbacks pointed out in the foregoing. This object is obtained by providing a hollow space between the rotatable piston-part and that surface which serves as resisting bearing for the rotatable piston-part during recoil. This hollow space is adapted to receive brake-fluid and it communicates with that side of the brake-cylinder from which brake-fluid is forced out during recoil.

In the accompanying drawing, the invention is, by way of example, shown applied to the type of fluid-brake shown in the patent of Otto Lauber and Norbert Koch, #887,045, of May 5, 1908.

Figure 2:
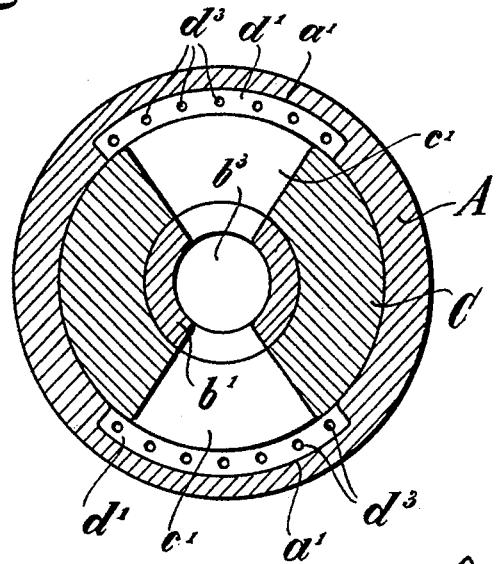

Figure 1 is a longitudinal section through the piston and a part of the brake-cylinder, and Fig. 2 is a section on line 2—2, Fig. 1, looking from the left.

A indicates the brake-cylinder in which spiral grooves $a^1$ are cut. The piston-rod B terminates in a head $b^1$ which is provided with an axial bore $b^3$ extending to the front face of the head. The free end of the head is provided with a flange $b^2$. The head $b^1$ is provided with an annular piston-body C which is screwed on the head on the side toward the piston-rod. A ring D which is provided with projections $d^1$ snugly fitting in the guide-grooves $a^1$, is rotatably mounted on the head $b^1$. The fluid passes from one side of the piston to the other through the grooves $a^1$ of the brake-cylinder and passages $c^1$ in the piston-body C and in the head $b^1$ $c^1$ which passages open into the bore $b^3$. An annular space $d^2$ (Fig. 1) which is formed by a recess in the ring D is provided between the flange $b^2$ and the ring D and is adapted to receive brake-fluid. Through the medium of channels $d^3$ (see also Fig. 2) which open into the grooves $a^1$ the space $d^2$ communicates with that side of the brake-cylinder—the piston-rod side—from which brake-fluid is forced out during the recoil. When the piston recoils after firing, in the direction of the arrow $x$ (Fig. 1), the projections $d^1$ slide along the walls of the spiral grooves $a^1$ and turn the ring D relatively to the piston. The fluid-pressure, which by reason of the movement of the piston is created on the piston-rod side of the brake-cylinder A, acts on the projections $d^1$ of the ring D extending into the grooves $a^1$ and forces the ring against that surface of the flange $b^2$ which serves as resisting bearing for the ring. Through the medium of the channels $d^3$ and the hollow space $d^2$ the brake-fluid at the same time exerts a pressure on the ring D which counteracts the fluid-pressure acting on the projections $d^1$ of the ring. The ring D is therefore relieved of pressure and the friction between the ring and the flange $b^2$ is thus effectively decreased and the wear on the walls of the grooves $a^1$ and on the projections $d^1$ which cause the ring D to rotate is consequently equally decreased.

Although the invention is primarily adapted for use for the recoil, as the forces acting during the recoil are considerably greater than those acting during the counter-recoil, it is evident that the invention is not limited to such use. On the contrary in the embodiment shown in the drawing, another fluid-space might be provided between the ring D and the piston-body C, which serves as resisting bearing for the ring during the counter-recoil, which space would be connected by means of channels with that side of the brake-cylinder from which the brake-cylinder is forced out during counter-recoil. In both instances, viz. relief of pressure on the ring D during recoil and during counter-recoil, it is preferable to make the fluid-space between the rotatable piston-part and its resisting bearing of such dimensions that the pressure which is exerted on the rotatable piston-part due to the provision of the aforesaid fluid-space is approximately equal to the pressure exerted by the brake-fluid on the projections $d^1$ of the ring D.

Having thus described the invention what is claimed and desired to be secured by Letters Patent, is:—

1. In a recoil-gun fluid-brake piston, having a part which rotates relatively to the piston and is subjected to the braking pressure; a fluid pressure counter-balance acting upon said relatively rotating part in opposition to the braking pressure.

2. In a fluid-brake for recoil guns, a brake cylinder, a piston working in said brake cylinder and having a part which rotates relatively to the piston and is subjected to braking fluid pressure; means supplying fluid under pressure to the side of said relatively rotating part opposite to that which encounters the braking pressure.

3. A fluid-brake having a brake-cylinder, a piston provided with a part engaging a part of the brake-cylinder and rotatable relatively to the piston, a surface forming a resisting bearing for said piston-part during the movement of the piston, a hollow space located on one side of the rotatable piston-part between said surface and the rotatable piston-part, and a passage providing communication between said hollow space and the space of the brake-cylinder on the other side of the rotatable piston-part.

4. A fluid-brake having a brake-cylinder, a piston provided with a part engaging a part of the brake-cylinder and rotatable relatively to the piston, a surface forming a resisting bearing for said piston-part during recoil, a hollow space adapted to receive brake-fluid and located between said surface and the rotatable piston-part, and means providing communication between said hollow space and that space of the brake-cylinder from which the brake-fluid is forced out during recoil.

5. A fluid-brake having a brake-cylinder, a piston provided with a part engaging a part of the brake-cylinder and rotatable relatively to the piston, a surface forming a resisting bearing for said piston-part during counter-recoil, a hollow space adapted to receive brake-fluid and located between said surface and the rotatable piston-part, and means providing communication between said hollow space and that space of the brake-cylinder from which the brake-fluid is forced out during counter-recoil.

6. A fluid-brake having a brake-cylinder, a piston provided with a part engaging a part of the brake-cylinder and rotatable relatively to the piston, said piston part having a surface exposed to the action of the fluid-pressure during the movement of the piston, a surface forming a resisting bearing for said piston-part during the movement of the piston, a hollow space located on one side of the piston-part between said bearing surface and the piston-part, and a passage providing communication between said hollow space and the space of the brake-cylinder on the other side of the rotatable piston-part, said hollow space being of such dimensions that the pressure of the brake-fluid therein approximately balances the pressure of the brake-cylinder on said exposed surface of the rotatable piston-part.

The foregoing specification signed at Barmen, Germany, this 15th day of March, 1909.

WALTER HEILEMANN. [L. S.]

In presence of—
OTTO KÖNIG,
WILLY KLEIN.